(12) United States Patent
Jesse et al.

(10) Patent No.: US 8,792,764 B1
(45) Date of Patent: Jul. 29, 2014

(54) OPTICAL FIBER CLEAVER

(75) Inventors: Scott Duane Jesse, Lakeville, NY (US); Scott Eric Semmler, Forth Worth, TX (US)

(73) Assignee: Lee Technologies, Inc., Fort Worth, TX (US)

( * ) Notice: Subject to any disclaimer, the term of this patent is extended or adjusted under 35 U.S.C. 154(b) by 142 days.

(21) Appl. No.: 13/333,971

(22) Filed: Dec. 21, 2011

Related U.S. Application Data

(60) Provisional application No. 61/459,945, filed on Dec. 22, 2010.

(51) Int. Cl.
*G02B 6/25* (2006.01)
(52) U.S. Cl.
USPC .......................................... 385/134; 385/147
(58) Field of Classification Search
None
See application file for complete search history.

(56) References Cited

U.S. PATENT DOCUMENTS

| | | | |
|---|---|---|---|
| 4,503,744 A | 3/1985 | Garner et al. | |
| 4,530,452 A | 7/1985 | Balyasny et al. | |
| 4,621,754 A | 11/1986 | Long et al. | |
| 4,688,707 A | 8/1987 | Szostak et al. | |
| 5,024,363 A | 6/1991 | Suda et al. | |
| 5,031,321 A | 7/1991 | Briscoe | |
| 5,046,252 A | 9/1991 | Ayuta et al. | |
| 5,104,021 A | 4/1992 | Seike et al. | |
| 5,125,549 A * | 6/1992 | Blackman et al. | 225/96.5 |
| 5,195,157 A | 3/1993 | Penfold | |
| 5,501,385 A | 3/1996 | Halpin | |
| 6,189,757 B1 | 2/2001 | Yoshida et al. | |
| 6,668,128 B2 | 12/2003 | Hattori et al. | |
| 6,870,996 B2 | 3/2005 | Doss et al. | |
| 6,964,288 B2 | 11/2005 | Christopher et al. | |
| 6,973,252 B2 | 12/2005 | Doss et al. | |
| 7,310,470 B2 | 12/2007 | Ray et al. | |
| 2003/0006332 A1 | 1/2003 | Appleby et al. | |
| 2003/0085225 A1 | 5/2003 | Hodzic | |
| 2004/0057672 A1 | 3/2004 | Doss et al. | |
| 2004/0099121 A1 | 5/2004 | Itano et al. | |

(Continued)

OTHER PUBLICATIONS

OFS FITEL, LLC., OFS, "Marketing Communications FITEL-S325-S315-S310-0409", 2 pages, on p. 2, FITEL S310 and S315 Single Fiber Field Cleavers.

*Primary Examiner* — Mike Stahl
(74) *Attorney, Agent, or Firm* — Handley Law Firm, PLLC

(57) ABSTRACT

An optical fiber cleaver (12) is disclosed having a first pivot arm (16) for securing a terminal end of an optical fiber (22), a second pivot arm (18) with a cutting tool (82) for scoring an outer surface of the optical fiber (22), and a flexible arm (24) extending outward from underneath the cutting tool (82). A V-shaped locating groove (28) extends in the flexible arm (24). A stress-relief recess (36) is located on the surface (26) of the flexible arm (24) in a location at which the cutting tool (82) scores the optical fiber (22). An arcuately-shaped recess (92) is formed into a lower surface (96) of the flexible arm (24) beneath the stress-relief recess (36) to focus the bend in the optical fiber (22) where the fiber (22) is scored and the cleave is to occur. A flexible arm stop (90) is provided to control the minimum radius of the bend in the flexible arm (24) and the minimum radius of bend induced in the optical fiber (22) at the cleave.

20 Claims, 6 Drawing Sheets

(56) References Cited

U.S. PATENT DOCUMENTS

| | | |
|---|---|---|
| 2005/0230052 A1 | 10/2005 | Christopher et al. |
| 2006/0201982 A1 | 9/2006 | Yazaki et al. |
| 2007/0292092 A1 | 12/2007 | Hayashi et al. |
| 2009/0103870 A1 | 4/2009 | Solomon et al. |
| 2009/0180742 A1 | 7/2009 | Van Noten et al. |
| 2010/0163593 A1* | 7/2010 | Song et al. ............... 225/96 |
| 2010/0215318 A1* | 8/2010 | Suematsu et al. ......... 385/60 |
| 2010/0270350 A1 | 10/2010 | Bylander et al. |

* cited by examiner

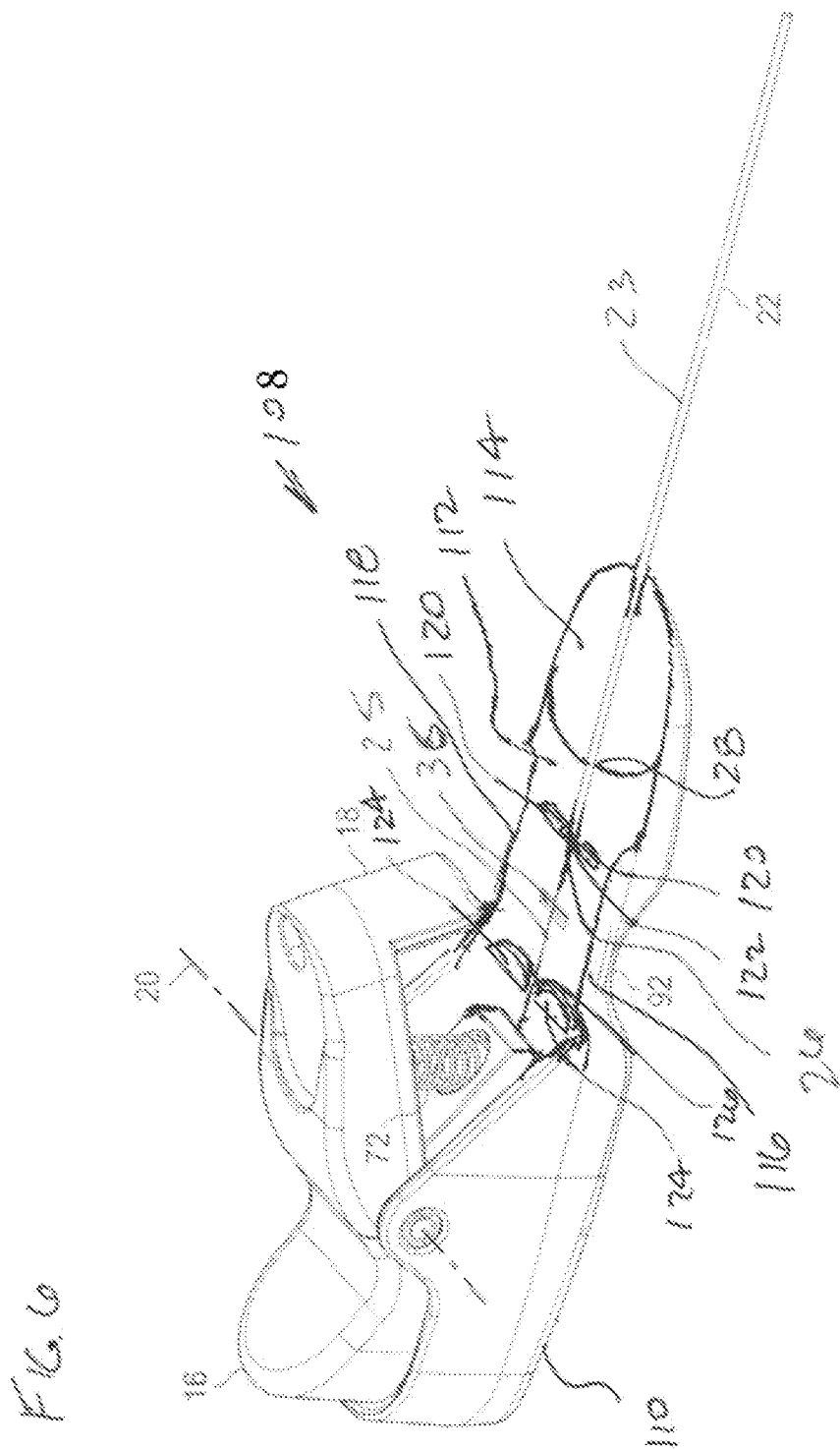

OPTICAL FIBER CLEAVER

CROSS-REFERENCE TO RELATED APPLICATION

The present application is related to U.S. Provisional Patent Application Ser. No. 61/459,945, and filed Dec. 22, 2010, and invented by Scott Duane Jesse, and assigned to Lee Technologies, Inc., the assignee of the present application.

TECHNICAL FIELD OF THE INVENTION

The present invention relates in general to optical fiber cleavers, and in particular to score and snap optical fiber cleavers for field use.

BACKGROUND OF THE INVENTION

Optical fibers are commonly spliced together in the field to join the butt ends of optical fibers for transmitting light signals through the joined optical fibers. In creating an optical fiber splice, a plastic sleeve providing a fiber jacket is first stripped from the ends of each optical fiber. An optical fiber cleave tool is then used to first score each fiber where butt ends are to be created for each fiber, and then each fiber is placed under tension to cause stress fractures to propagate where the fibers have been scored. It is preferable to apply a low tension to each fiber so that stress fractures will occur transverse to, or perpendicular to, the longitudinal axes of the respective fibers creating optically smooth, mirror-like surfaces which will transmit the light signals with minimal signal loss caused by non-conformities on the butt end faces. Non-conformities on end faces such as rough surfaces disperse the light traveling through the butt splices, resulting in transmission losses.

Prior art optical fiber cleavers are commonly available. One such prior art optical fiber cleaver for field use has a first pivot arm which provides a clamp for securing a terminal end of one of the optical fibers, a second pivot arm with a cutting tool, or blade, for scoring an outer surface of the optical fiber, and a flexible arm extending outward from the clamp and underneath the cutting tool. The optical fiber being cleaved first has the terminal end stripped and then is laid lengthwise in a rectangular-shaped locating groove extending longitudinally in the flexible arm. The terminal end of the optical fiber is clamped beneath the first pivot arm. The second pivot arm is then pressed downward to press the cutting tool into and scoring the outer surface of the optical fiber, without cutting through the optical fiber. The flexible arm is then bent while holding the optical fiber in the rectangular shaped groove to bend the optical fiber until a stress fracture occurs, preferably propagating from the scored outer surface and extending across the width of the optical fiber, transversely to the length of the optical fiber. A person using the optical fiber cleaver will typically hold the optical fiber against the flexible arm and in the rectangular-shaped locating groove using his thumb.

Several problems have been noted with such prior art optical fiber cleavers. Pressing the cutting tool held in the second pivot arm against the optical fiber while holding the optical fiber against a flat surface has resulting in crushing the optical fiber when excessive force is applied. Crushing does not provide a smooth, mirror like surface which provides for low signal loss in butt joints. A second problem arises in that optical fibers with jacket diameters of varying sizes are prone to rolling in the rectangular shaped grooves formed into the flexible arm, which can also result in creating light dispersing non-conformities in the end face created during cleaving. Yet another problem occurs due to the flexible arm being of uniform width and thickness, such that an entire length of the flexible arm bends rather than focusing the bending close to the cleave. Bending along the length of the flexible arm increases the requisite level of skill and technique required to obtain a uniformly surface from an end face resulting from a cleave. Further, the flexible arm does not have a stop to control the amount of bend to which the optical fiber end is subjected, further increasing the skill and technique levels required to obtain a clean cleave.

SUMMARY OF THE INVENTION

A novel optical fiber cleaver is disclosed having a first pivot arm which provides a grip arm for securing a terminal end of an optical fiber, a second pivot arm with provides a cleave arm having a cutting tool for scoring an outer surface of the optical fiber, and a flexible arm extending outward from the clamp and underneath the cutting tool. A V-shaped locating groove extends in the flexible arm, from an outer jacket locating stop. A thumb locating depression is formed in an outward end of the flexible arm. A stress-relief recess is located on the surface of the flexible arm in the location at which the cutting tool in the cleave arm is pressed against the optical fiber to score the fiber. An arcuately-shaped recess is formed into a lower side of the thickness of the flexible arm beneath the location of the stress-relief recess, to locate the bending of the flexible arm to focus the bend in the optical fiber where the fiber is scored and the cleave is to occur. A flexible arm stop is provided to control the minimum radius of the bend in the flexible arm and thus the minimum radius of bend induced in the optical fiber at the cleave.

During use, the optical fiber being cleaved first has the terminal end stripped of an outer plastic jacket and then is laid lengthwise in a V-shaped locating groove extending longitudinally in the flexible arm, and located lengthwise along the flexible arm by engaging the terminal end of the jacket around the fiber against a fiber jacket locating stop. The terminal end of the optical fiber is clamped beneath the clamp arm. A user places his thumb on a locating depression in the flexible arm to retain the optical fiber in the V-shaped groove and extending above the stress relief recess underneath the cleave arm cutting tool. The cleave arm is then pressed downward to press the cutting tool into and scoring the outer surface of the optical fiber, without cutting through the optical fiber. The flexible arm is then bent while holding the optical fiber in the V-shaped groove to bend the optical fiber until a stress fracture occurs, preferably propagating from the scored outer surface and extending across the width of the optical fiber, transversely to the length of the optical fiber. The recess underneath the flexible arm controls the location of the bend in the flexible arm and the optical fiber and a stop underneath the flexible arm controls the amount of bend to control the level of stress occurring in the optical fiber during the cleave.

DESCRIPTION OF THE DRAWINGS

For a more complete understanding of the present invention and the advantages thereof, reference is now made to the following description taken in conjunction with the accompanying Drawings in which FIGS. 1 through 6 show various aspects for optical fiber cleaver with flexible arm and arm stop made according to the present invention, as set forth below:

FIG. 1 is a perspective view looking toward the front side of an optical fiber cleaver;

FIG. 2 is an exploded view of the optical fiber cleaver, looking toward a rearward end the fiber cleaver;

FIG. 3 is a longitudinal section view of the optical fiber cleaver of FIG. 2, taken along section line 3-3 of FIG. 2;

FIG. 4 is perspective view of a right side of the optical fiber cleaver, looking at a lower portion of the optical fiber cleaver;

FIG. 5 is a longitudinal section view of the optical fiber cleaver; and

FIG. 6 is a perspective view of an alternative design for an optical fiber cleaver.

DETAILED DESCRIPTION OF THE INVENTION

Figure 1:
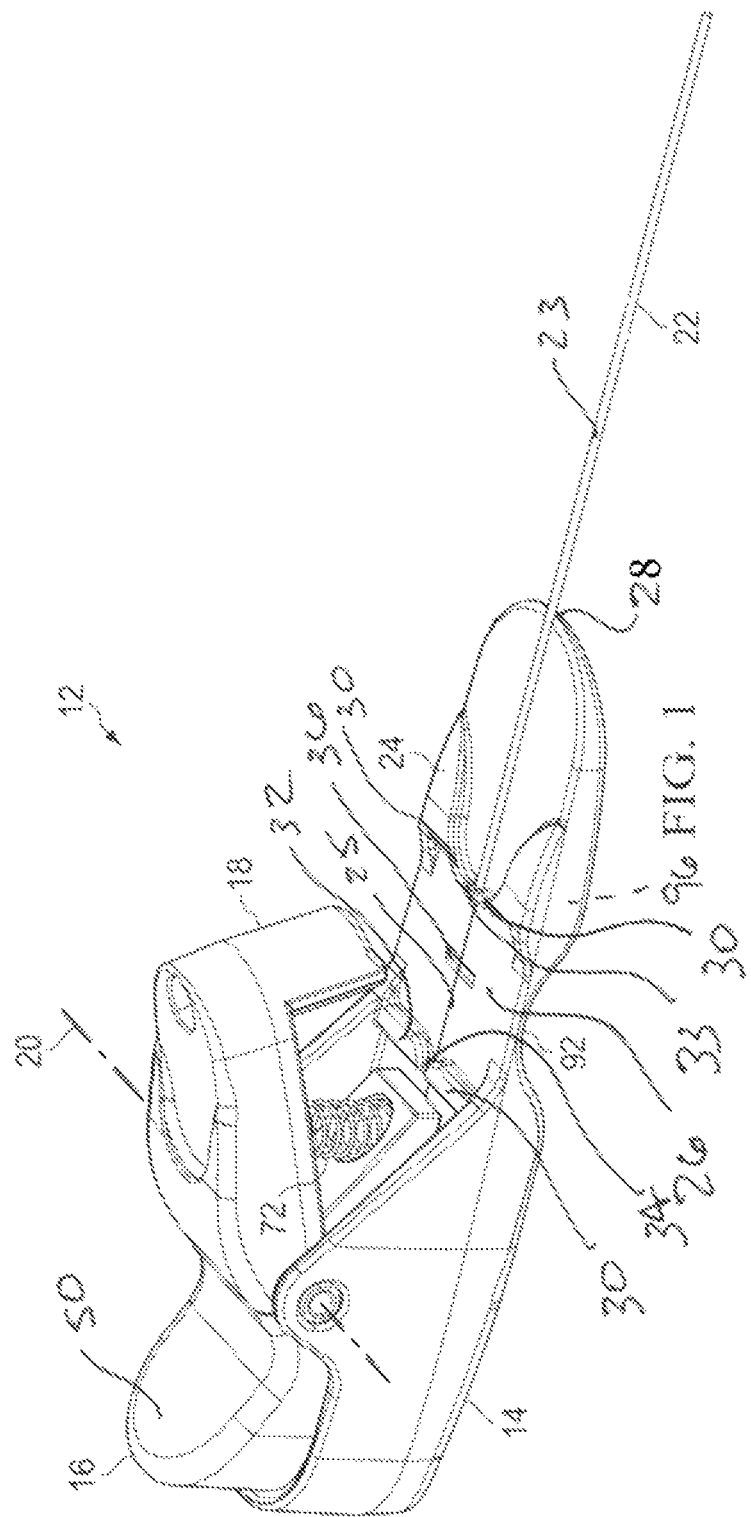

FIG. 1 is a perspective view looking toward the front side of an optical fiber cleaver 12. The cleaver 12 has a base 14, a grip arm 16, a cleave arm 18 and an elongate flexible arm 24. An optical fiber 22 has a protective sleeve 23 disposed about a bare glass fiber 25. The grip arm 16 and the cleave arm 18 are pivotally mounted to the base 14 for pivoting about an axis 20. The grip arm 16 is provided by a first pivot arm which presses against a stripped end of the optical fiber 22 to press the bare glass fiber 25 against the base 14 to retain the fiber 22 in a fixed position relative to the base 14. The cleave arm 18 is provided by a second pivot arm which is moved downward to score a portion of the bare glass fiber 25 of the optical fiber 22. A flexible arm 24 extends outward from the base 14, and is bent to bend the optical fiber 22 and cleave the fiber 22 such that it separates to provide a butt end for the bare glass fiber 25 having a smooth, mirror-like surface. The optical fiber 22 is shown located atop the flexible arm 24, extending along an upper surface 26 of the flexible arm 24 and the base 14. The flexible arm 24 has a length extending parallel with the length of the optical fiber 22, a width which extends generally perpendicular to the length of the flexible arm 24, an upper surface 26 and a lower surface 96. A thickness for the flexible arm 24 extends between the upper surface 26 and the lower surface 96, perpendicular to the length and the width of the flexible arm 24. A nominal thickness for the flexible arm 24 may be defined as the average thickness, or a median thickness, extending between the surfaces 26 and 96.

A V-shaped locating groove 28 is formed into the upper surface 26 of the flexible arm 24. The V-shaped groove 28 has two sidewalls which simultaneously engage the optical fiber 22 to prevent rotation of the optical fiber 22 when held underneath the cleave arm 18. Two opposed stop shoulders 30 are space apart to define a gap 33 in a central portion of the flexible arm 24. Two guide shoulders 32 are located on an edge portion of the base 14 disposed adjacent the flexible arm 24 and define a gap 34 which extends between the two shoulders 32. The gaps 33 and 34 are sized for passing the bare glass fiber 25 but not the outer protective sleeve 23. A terminal end of the sleeve 23 will engage an outward surface of the two stop shoulders 30, locating the optical fiber 22 relative to the optical fiber cleaver 12 and the cleave arm 18, and the grip arm 16. A recess 36 is provided in a central portion of the flexible arm 24. The recess 36 has a width extending parallel to the longitudinal length if the optical fiber 22 sufficient to allow the stripped, bare glass fiber 25 of the optical fiber 22 to flex into the recess 36 if excessive force is applied by the cleave arm 18.

Figure 2:
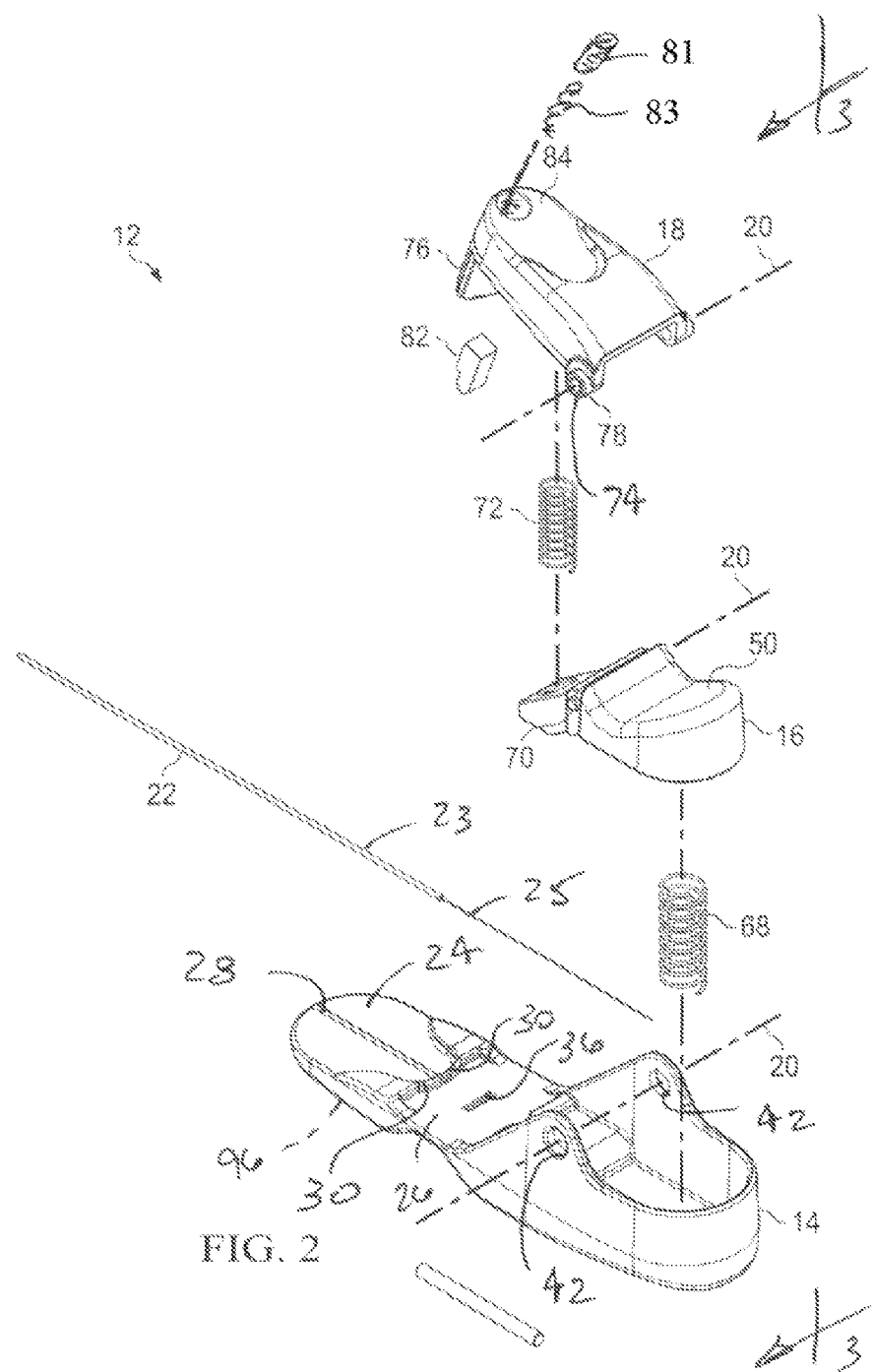
Figure 3:
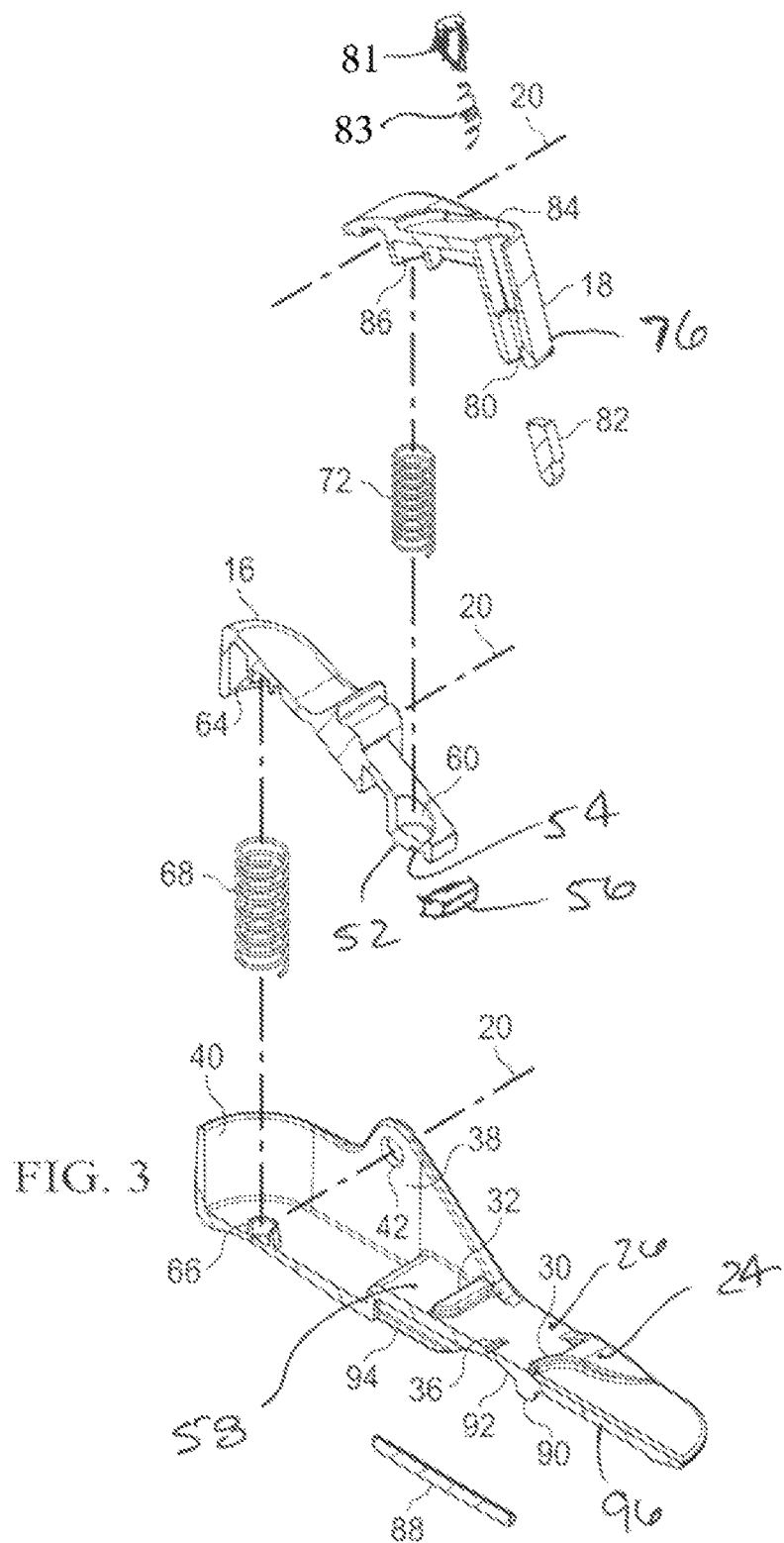

FIG. 2 is an exploded view of the optical fiber cleaver 12, looking toward the rearward end the fiber cleaver 12, and FIG. 3 is a longitudinal section view of the optical fiber cleaver 12, taken along section line 3-3 of FIG. 2. The base 14 has sidewalls 38 which define a grip arm cavity 40. Pivot holes 42 extend through the sidewalls 38 and concentrically disposed about the axis 20. A thumb tab 50 is provided atop one end of the grip arm 16. A grip tab 52 extends downward from the grip arm 16 for engaging against the bare glass fiber 25 of the optical fiber 22. A grip member recess 54 is formed into the lower end of the grip tab 52 for receiving a grip member 56. The grip member 56 is preferably an elastomeric member which is disposed within the grip recess 54 for pressing against the bare glass fiber 25 against a flat surface 58 of the base 14. A spring recess 60 is provided in a forward end of the grip tab 16. A spring boss 64 extends downward from a lower end of the grip tab 16 and a spring boss 66 is defined in a central portion of the base 14. The grip arm spring 68 extends around the spring boss 66 upward to and around the spring boss 64 for urging the grip arm 16 into a clamped position for retaining the optical fiber 22 in a fixed position along the V-shaped guide groove 28.

Two pivot posts 70 extend on opposite sides of the grip arm 16 for being received within respective ones of pivot posts recess 74 defined within an annular-shaped pivot posts 78 of the cleave arm 18. The annular-shaped pivot posts 78 provide both pivot pin means and a bearing means for pivotally mounting the pivot posts 70 interiorly within the pivot posts 78. The annular-shaped pivot posts 78 and the pivot posts 70 together provide a pivot pin means for pivotally connecting the grip arm 16 to the cleave arm 18, and the grip arm 18 and the cleave arm 18 to the base 14 without use of a separate pivot pin member. In other embodiments of the present invention, pivot pin means may include a separate pivot pin member rather than the post 70 and the annular-shaped pivot post 78. A cutting head spring 72 extends between the recess 60 and the forward end of the grip arm 16 and interiorly within a spring recess 86 defined within one end of the cleave arm 18. The springs 68 apply a force rearward of the axis 20 for urging the grip arm 16 into a gripping position. The spring 72 extends from an end on the upper side of the grip arm 16 to a portion of the spring recess 86 which are disposed forward of the axis 20.

A cleave boss 76 defines a cutting head or an outward end of the cleave arm 18, with an axis preferably extending perpendicular to a flat planar surface of the main body of the cleave arm 18. Two opposed pivot pins extend on opposite sides of the rearward end of the cleave arm 18 and include the recess 74 for receiving the pivot posts 70 of the grip arm 16. The annular-shaped pivot posts 78 fit within the pivot holes 42 of the sidewalls 38 of the base 14. A cutting tool recess 80 is defined by an aperture which extends longitudinally through the cleave boss 76 for receiving a cutting tool 82. The cutting tool 82 has a sharp point for scoring the optical fiber 22. A fastener 81 and bias spring 83 secure the cutting tool 82 within the cutting tool recess 80. A push surface 84 is defined one on end of the cleave arm 18, disposed immediately above the cleave boss 76, opposite the cutting tool 82. A stop pin 88 is disposed beneath on the bottom side of the base 14 and extends forward towards underneath the flexible arm 24. A stop tab 90 extends downward from beneath the flexible arm 24.

Figure 4:
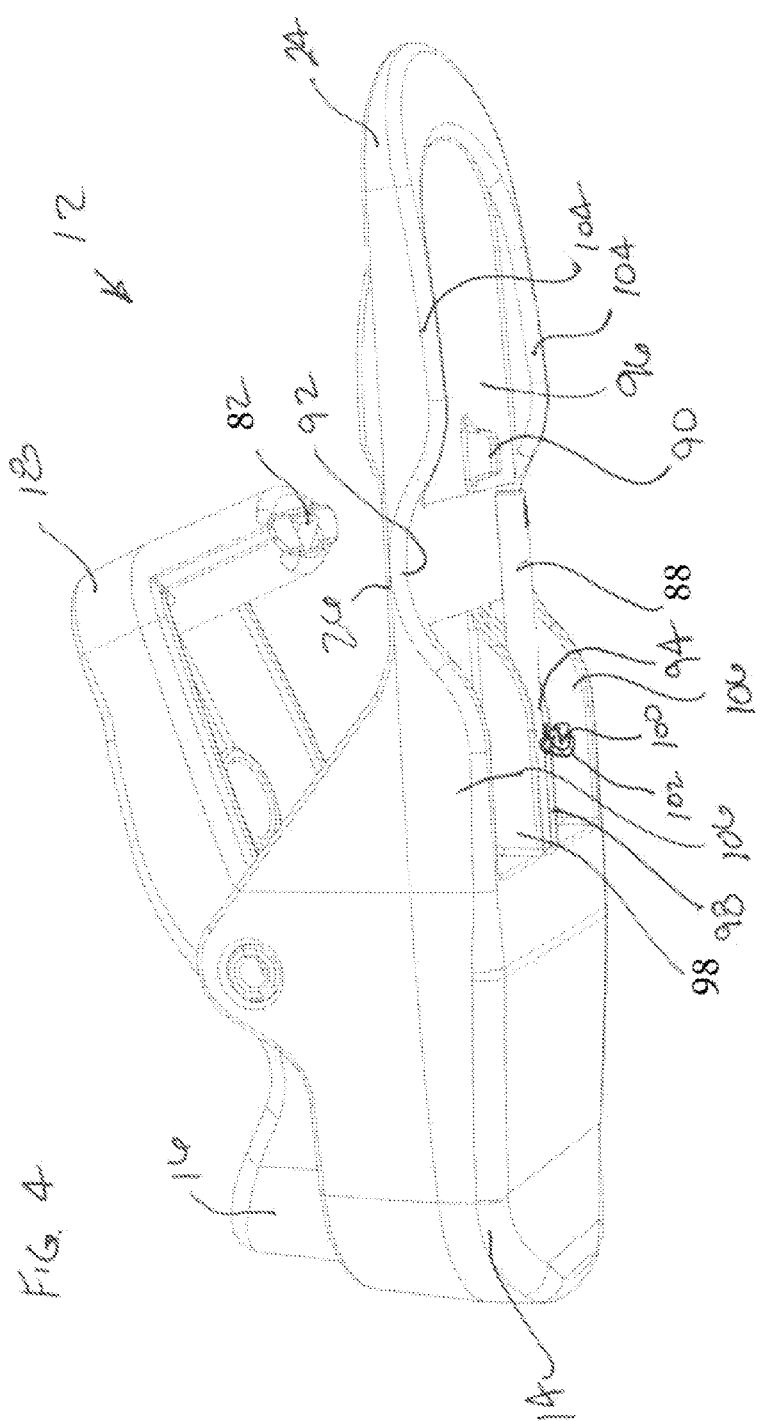

FIG. 4 is side elevation perspective view looking underneath the optical fiber cleaver 12 showing an underside of the flexible arm 24, showing the normal position without pressure being applied to bend the flexible arm downward. During use, the flexible arm 24 will be urged downward to break the optical fiber 22 along the score provided by the cutting tool 82 engaging the optical fiber 22. The stop pin 88 is shown spaced apart from the stop tab 90. During use, the stop pin 88 will engage the stop tab 90 to prevent further bending of the flexible arm about the recess 92 once a preferred amount of bend is inducted in the flexible arm 24. A recess 92 is arcuately shaped beneath the flexible arm 24 for controlling the curvature of the flexible arm 24 when pushed downward. That is, the recess 92 defines a bend region determined by a reduced thickness occurring by means of the recess 92, and focuses the center of the bend in the flexible arm beneath and co-planar with the score made in the optical fiber. A stop pin recess 94 is preferably defined by two elongate ribs 98 which are spaced apart for receiving the stop pin 88. A threaded boss 102 is formed into the side of one of the elongate ribs 98 for receiving a fastener 100 to secure the stop pin 88 within the stop pin recess 94. Elongate ribs 104 and 106 provide stiffeners on the lower side of the flexible arm 24. The elongate ribs 104 and 106 in combination with the arcuate recess 94 focus the bend to occur in an optical fiber 22 at the location where the fiber 22 has been scored, with a central axis for the bend co-planar with the score in the optical fiber 22 (not shown).

Figure 5:
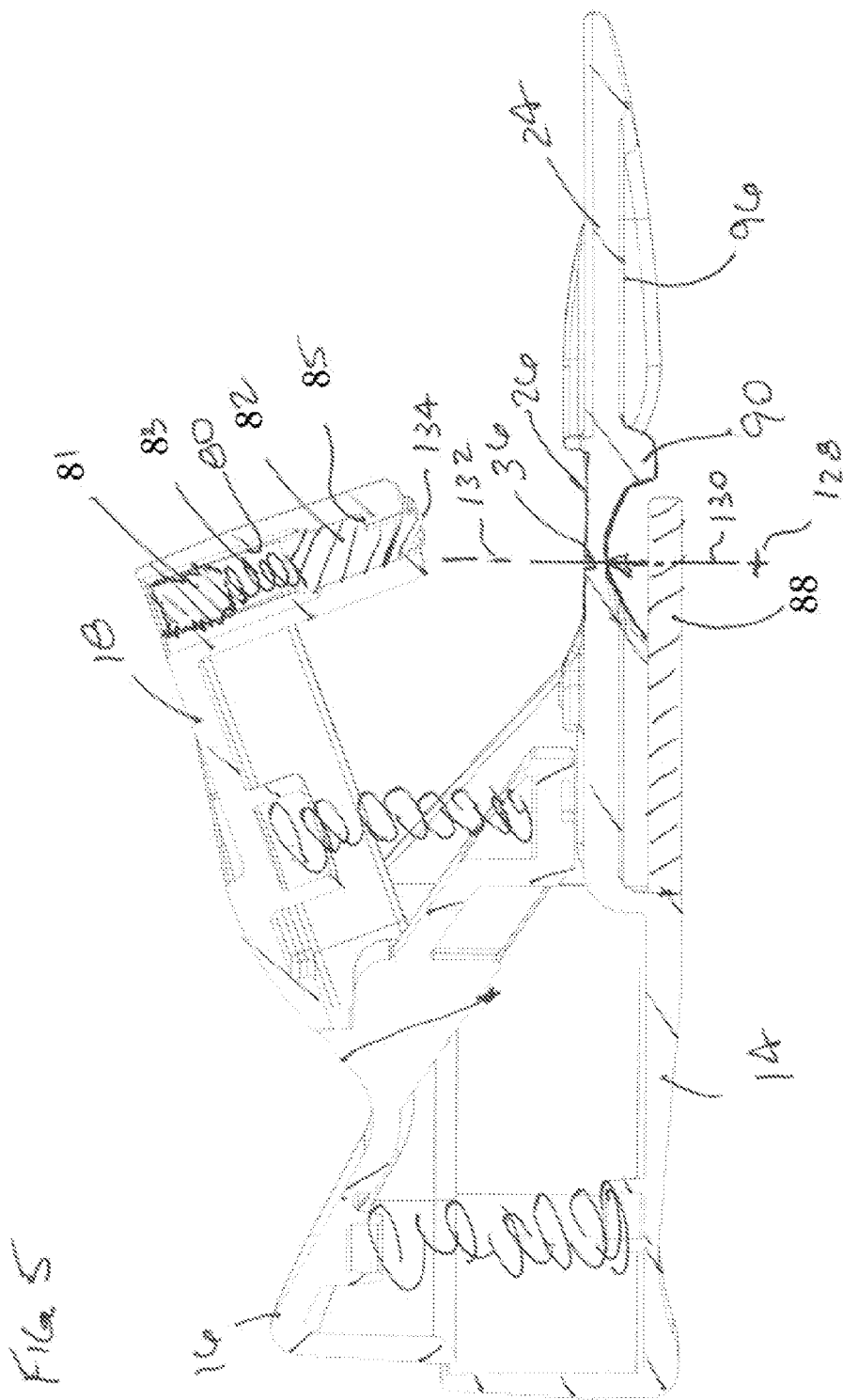

FIG. 5 is a longitudinal section view of the optical fiber cleaver 12. The fastener 81 and the bias spring 83 are shown located in the cleave boss 76. The cutting tool recess 80 is defined by an aperture which extends longitudinally through the cleave boss 76 for receiving the fastener 81, the bias spring 83 and the cutting tool 82. The upper end of the cutting tool recess 80 is threaded for securing the fastener 81. A shoulder 85 is provided in the lower end of the cutting recess 80, spaced apart from a lower opening in the cutting recess 80, for engaging a shoulder on the cutting tool 82 to retain the cutting tool 82 and the bias spring 83 within the cutting recess 80. The fastener 81 is preferably an allen screw and the bias spring 83 is preferably provided by a metal coil spring.

The optical fiber cleaver 12 preferably has the arcuately shaped recess 92 extending into the lower surface 96 of the flexible arm 24, defining the thinned region in the thickness of the flexible arm 24. The arcuately shaped recess 92 may in some embodiments be circular in shape (not shown). Preferably the arcuately shaped recess 92 has a centerline 128, shown as a center point 128 in FIG. 5, and a radius 130 of varied length, such that the centerline 128 and the radius 130 at one point along the arcuate shape of the recess 92 is aligned in a singular plane 132 with the recess 36 and the point at which a tip 134 of the cutting tool blade 134 will engage and score the optical fiber 22 (fiber 22 shown in FIG. 1). This preferred configuration will focus the bending moment of the flexible arm 24 into a coplanar alignment in the plane 132 with the stress relief recess 36 and the point at which the tip 134 of the cutting tool 82 scores the bare optical fiber 25 (shown in FIG. 1). Preferably, the plane 132 is also perpendicular to the longitudinal length of the optical fiber 22

FIG. 6 is a perspective view of an alternative design for an optical fiber cleaver 108. The cleaver tool 108 has a base 110 with a flexible arm 112 having a thumb locating detent 114, providing a recess in which users may place their thumbs for gripping the end of the flexible arm 112. The V-shaped locating groove 28 preferably ends adjacent the thumb locating detent 114, with the detent 114 preferably being provided by a smooth surface without the locating groove extending therein. Additionally, recesses 116 and 118 are formed into the sides of an intermediate portion of the flexible arm 112 providing an hour glass shape, or dog-bone shape, to the flexible arm 112. Stop shoulders 120 are provided with a gap 122 and guide shoulders 124 are provided with a gap 126 for locating and guiding the optical fibers 22 in relation to the optical fiber cleaver 108.

The present invention provides advantages of an optical fiber cleaver tool for field use having a first pivot arm for securing a terminal end of an optical fiber, a second pivot arm with a cutting tool for scoring an outer surface of the optical fiber, and a flexible arm extending outward from underneath the cutting tool. A locating groove with a V-shaped cross section extends in the flexible arm for locating the optical fiber on the cleaver tool. A stress-relief recess is located on the surface of the flexible arm in a location at which the cutting tool scores the optical fiber, allowing the fiber to flex into the recess to prevent the fiber from being crushed during scoring. An arcuately-shaped recess is formed into a lower side the flexible arm beneath the stress-relief recess to focus the bend in the optical fiber where the fiber is scored and the cleave is to occur, such that flexion of the optical fiber is centered where the fiber has been scored. A flexible arm stop is provided to control the minimum radius of the bend in the flexible arm and the minimum radius of bend induced in the optical fiber at the cleave which limits the level of tensile stress placed on the optical fiber and avoids placing the fiber being scored in compression.

Although the preferred embodiment has been described in detail, it should be understood that various changes, substitutions and alterations can be made therein without departing from the spirit and scope of the invention as defined by the appended claims.

What is claimed is:

1. An optical fiber cleaver comprising:
   a base;
   a flexible arm having a first portion, a second portion and a length extending outward from said base, with said first portion of said flexible arm disposed adjacent to said base and said second portion disposed outward of said base and adjacent to said first portion, and said flexible arm having an upper surface, a lower surface, a nominal thickness extending there-between, with said first portion and said second portion having widths which extend transverse to said length of said flexible arm;
   said flexible arm having a thinned region extending into said nominal thickness of said first portion of said flexible arm, with said thinned region extending generally perpendicular to said length of said flexible arm, wherein said thinned region is formed for focusing bending of said flexible arm at said first portion;
   a cleave arm pivotally secured to said base, said cleave arm having a cutting tool which extends outward of said cleave arm, wherein said cleave arm is disposed for moving downward toward said upper surface of said flexible arm, with said cutting tool aligned for engaging said optical fiber above said thinned region of said flexible arm; and
   wherein an optical fiber is disposed on said flexible arm, extending adjacent said upper surface of said flexible arm and between a grip member and said base, said cleave arm can be moved to press said cutting tool against said optical fiber and to score said optical fiber, and said first portion of said flexible arm can be bent to cleave said optical fiber with bending of said flexible arm and said optical fiber aligned with said score.

2. The optical fiber cleaver according to claim 1, further comprising said flexible arm having a stress-relief recess formed into said upper surface and located in said first portion above said thinned region, wherein said stress-relief recess is centrally disposed along said length of said flexible arm intermediate between said second portion and said base, co-planar with said thinned region and said cutting tool when scoring said optical fiber.

3. The optical fiber cleaver according to claim 1, wherein said flexible arm has a locating groove formed into said upper surface of said flexible arm in said second portion, and said locating groove disposed in said second portion and extending parallel to said length of said flexible arm, and said locating groove has a V-shaped cross-section.

4. The optical fiber cleaver according to claim 1, wherein said thinned region is formed by an arcuately shaped recess formed into said lower surface of said flexible arm.

5. The optical fiber cleaver according to claim 1, further comprising:
   a stop pin secured beneath said base, said stop pin extending outward from beneath said base and beneath said flexible arm in a direction aligned with said length of said flexible arm;
   a stop tab extending beneath said flexible arm, spaced apart from said stop pin when said flexible arm is in a neutral position; and
   wherein said stop pin engages said stop tab when said flexible arm is disposed in a flexed position in which said flexible arm is bent in said first portion to apply shear stresses to the optical fiber being cleaved.

6. The optical fiber cleaver according to claim 1, further comprising stiffener ribs extending beneath said lower surface of said second portion of said flexible arm.

7. The optical fiber cleaver according to claim 1, further comprising a thumb depression formed into said upper surface, in said second portion of said flexible arm, outward of said first portion and said thinned region.

8. The optical fiber cleaver according to claim 1, further comprising pivot pin means for pivotally mounting said grip member and said cleave arm to said base along a singular axis.

9. An optical fiber cleaver comprising:
   a base;
   a flexible arm having a first portion, a second portion and a length extending outward from said base, with said first portion of said flexible arm disposed adjacent to said base and said second portion disposed outward of said base and adjacent to said first portion, and said flexible arm having an upper surface, a lower surface, a nominal thickness extending there-between, with said first portion and said second portion having widths which extend transverse to said length of said flexible arm;
   said flexible arm having an arcuately-shaped recess formed into said lower surface, located in said first portion and defining a thinned region extending into said nominal thickness of said flexible arm, with said thinned region extending generally perpendicular to said length of said flexible arm;
   said flexible arm having a V-shaped locating groove formed into said upper surface of said flexible arm in said second portion, said V-shaped locating groove centrally disposed in said second portion and extending with a groove length which extends along said length of said flexible arm;
   said flexible arm having a stress-relief recess formed into said upper surface and located in said first portion above said thinned region defined by said arcuately-shaped recess, wherein said stress-relief recess is centrally disposed along said length of said flexible arm intermediate between said V-shaped locating groove and said base;
   a grip arm pivotally secured to said base, said grip arm disposed with a grip member disposed on one end for engaging against said base adjacent said first portion of said flexible arm and aligned in lineal arrangement with said stress-relief recess and said groove length of said V-shaped groove;
   a cleave arm pivotally secured to said base, said cleave arm having a cutting tool which extends outward of said cleave arm, wherein said cleave arm is disposed for moving downward toward said upper surface of said flexible arm, atop said stress-relief recess; and
   wherein an optical fiber is disposed in said V-shaped locating groove, extending atop said stress-relief recess and between said grip member of said grip arm and said base, said cleave arm can be moved to press said cutting tool against said optical fiber and to score said optical fiber, and said first portion of said flexible arm can be bent to cleave said optical fiber.

10. The optical fiber cleaver according to claim 9, wherein said stress relief recess, said arcuately-shaped recess and said cutting tool when engaging said optical fiber are co-planar.

11. The optical fiber cleaver according to claim 9, further comprising:
    a stop pin secured beneath said base, said stop pin extending outward from beneath said base and beneath said flexible arm in a direction aligned with said length of said flexible arm;
    a stop tab extending beneath said flexible arm, spaced apart from said stop pin when said flexible arm is in a neutral position; and
    wherein said stop pin engages said stop tab when said flexible arm is disposed in a flexed position in which said flexible arm is bent in said first portion to apply shear stresses to the optical fiber being cleaved.

12. The optical fiber cleaver according to claim 9, further comprising stiffener ribs extending beneath said lower surface of said second portion of said flexible arm.

13. The optical fiber cleaver according to claim 9, further comprising a thumb depression formed into said upper surface, in said second portion of said flexible arm on an opposite side of said V-shaped locating groove from said first portion and said stress-relief recess.

14. The optical fiber according to claim 9, further comprising pivot posts pivotally disposed within annular-shaped pivot posts which together pivotally mount said grip arm and said cleave arm to said base along a singular axis, wherein said annular-shaped pivot posts are mounted to a first one of said grip arm and said cleave arm, said pivot posts are mounted to a second one of said grip arm and said cleave arm, and said pivot posts are pivotally secured within said annular-shaped pivot posts to pivotally secure together said grip arm and said cleave arm.

15. An optical fiber cleaver comprising:
    a base;
    a flexible arm having a first portion, a second portion and a length extending outward from said base, with said first portion of said flexible arm disposed adjacent to said base and said second portion disposed outward of said base and adjacent to said first portion, and said flexible arm having an upper surface, a lower surface, a nominal thickness extending there-between, with said first portion and said second portion having widths which extend transverse to said length of said flexible arm, wherein said first portion defines a first width which is narrower than a second width defined by said second portion;
    said flexible arm having an arcuately-shaped recess formed into said lower surface, located in said first portion and defining a thinned region extending into said nominal thickness of said flexible arm, with said thinned region extending generally perpendicular to said length of said flexible arm;
    said flexible arm having a V-shaped locating groove formed into said upper surface of said flexible arm in said second portion, said V-shaped locating groove centrally disposed in said second portion and extending with a groove length which extends along said length of said flexible arm;

said flexible arm having a stress-relief recess formed into said upper surface and located in said first portion above said thinned region defined by said arcuately-shaped recess, wherein said stress-relief recess is centrally disposed along said length of said flexible arm intermediate between said V-shaped locating groove and said base;

a grip arm pivotally secured to said base, said grip arm disposed with a grip member disposed on one end for engaging against said base adjacent said first portion of said flexible arm and aligned in lineal arrangement with said stress-relief recess and said groove length of said V-shaped groove;

a cleave arm pivotally secured to said base, said cleave arm having a cutting tool which extends outward of said cleave arm, wherein said cleave arm is disposed for moving downward toward said upper surface of said flexible arm, atop said stress-relief recess;

wherein an optical fiber is disposed in said V-shaped locating groove, extending atop said stress-relief recess and between said grip member of said grip arm and said base, said cleave arm can be moved to press said cutting tool against said optical fiber and to score said optical fiber, and said first portion of said flexible arm can be bent to cleave said optical fiber; and a stop pin secured beneath said base, said stop pin extending outward from beneath said base and beneath said flexible arm in a direction aligned with said length of said flexible arm;

a stop tab extending beneath said flexible arm, spaced apart from said stop pin when said flexible arm is in a neutral position; and wherein said stop pin engages said stop tab when said flexible arm is disposed in a flexed position in which said flexible arm can be bent in said first portion to apply shear stresses to the optical fiber being cleaved.

16. The optical fiber cleaver according to claim 15, further comprising stiffener ribs extending beneath said lower surface of said second portion of said flexible arm.

17. The optical fiber cleaver according to claim 15, wherein said stress relief recess, said arcuately-shaped recess and said cutting tool when engaging said optical fiber are co-planar.

18. The optical fiber cleaver according to claim 15, further comprising a thumb depression formed into said upper surface, in said second portion of said flexible arm on an opposite side of said V-shaped locating groove from said first portion and said stress-relief recess.

19. The optical fiber cleaver according to claim 15, wherein said grip arm and said cleave arm are pivotally mounted to said base along a singular axis.

20. The optical fiber cleaver according to claim 15, further comprising pivot posts pivotally disposed within annular-shaped pivot posts which together pivotally mount said grip arm and said cleave arm to said base along a singular axis, wherein said annular-shaped pivot posts are mounted to a first one of said grip arm and said cleave arm, said pivot posts are mounted to a second one of said grip arm and said cleave arm, and said pivot posts are pivotally secured within said annular-shaped pivot posts to pivotally secure together said grip arm and said cleave arm.

* * * * *